UNITED STATES PATENT OFFICE.

HENRY GREVILLE, OF BIRKENHEAD, ENGLAND.

TREATING FLOUR.

1,300,604. Specification of Letters Patent. Patented Apr. 15, 1919.

No Drawing. Application filed July 9, 1918. Serial No. 244,109.

*To all whom it may concern:*

Be it known that I, HENRY GREVILLE, subject of the King of Great Britain, residing at Birkenhead, in the county of Chester and Kingdom of England, have invented certain new and useful Improvements in Treating Flour, of which the following is a specification.

The present invention relates to improvements in the treatment of flour for bread-making with the object of giving a greater body and improved pile to the bread prepared from weak or medium wheat mixtures.

It has been suggested in bread making to add salts generally and more particularly potassium persulfate, calcium sulfate and magnesium sulfate as also various phosphates.

According to the present invention however normal sulfates or acid sulfates of alkali metal such as sodium, potassium, or ammonium as distinct from persulfates and pyrosulfates of a sufficient degree of purity are added to the flour.

These may be used singly or conjointly or may be mixed with other substances for the purpose of dilution or adding qualities to the flour not conferred or conferred only to a limited extent by these normal sulfates or acid sulfates.

These substances may be added at the rate of one or two ounces per sack of 280 pounds of a flour, but a greater or less proportion may be added if desired. The amount which it is advisable to add to any particular lot of flour should be decided by baking loaves in the usual manner from the flour treated with various proportions of the substances.

In the case of weak flours prepared from weak wheat mixtures quite a large proportion may be added with advantage, but too great a proportion is not desirable from a dietetic point of view, although it is found that the addition of 4 lbs. of sodium sulfate per sack of 280 lbs. flour is not injurious as the sulfate combines in some way with the dough made from the flour.

To more accurately describe the improvement effected it may be added, that the term "body" is used by bakers to denote the solidity of a loaf of bread while "pile" refers to the size of the loaf and its general appearance.

A loaf is described as well-piled when it is not only well risen but contains an even vesiculation inside, showing an attractive sheen with an absence of round holes. The substances used in the present invention improve the qualities of the loaf in a marked degree, owing to their stiffening action on the gluten of the dough which on baking yields bread of improved appearance and whiteness.

The substances may be added in powdered form, whether powdered crystals or powdered exsiccated salts when the addition is best made on the large scale by means of continuous mixing machines or the substances may be added during the baking process to the water used in doughing.

I declare that what I claim is:—

1. A process of making bread to improve the pile and body of the loaf, which includes the step of adding to the flour an alkali metal sulfate.

2. A composition of matter for making bread, consisting of flour having incorporated therewith an alkali metal sulfate in the approximate proportions of one to two ounces per two hundred and eighty pounds of flour.

In witness whereof, I have hereunto signed my name this 20th day of June, 1918, in the presence of two subscribing witnesses.

HENRY GREVILLE.

Witnesses:
 CHARLES LESLIE,
 J. MCLACHLAN.